(No Model.)

H. W. CALDWELL.
Conveyer Box.

No. 233,324. Patented Oct, 19, 1880.

Witnesses:
G. D. Knight,
H. E. Knight.

Inventor:
Henry W. Caldwell,
By Knight Bro's
Att'ys.

UNITED STATES PATENT OFFICE.

HENRY W. CALDWELL, OF ST. LOUIS, MISSOURI.

CONVEYER-BOX.

SPECIFICATION forming part of Letters Patent No. 233,324, dated October 19, 1880.

Application filed August 9, 1880. (No model.)

*To all whom it may concern:*

Be it known that I, HENRY W. CALDWELL, of the city of St. Louis, in the State of Missouri, have invented a certain new and useful Improvement in Conveyer-Boxes, of which the following is a full, clear, and exact description, reference being had to the accompanying drawings, making part of this specification, and in which—

Figure 1:
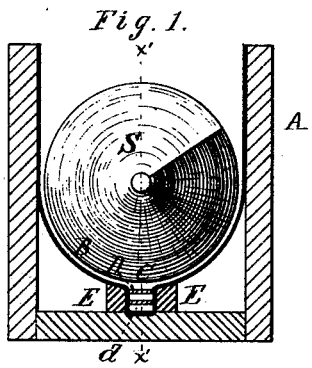
Figure 2:
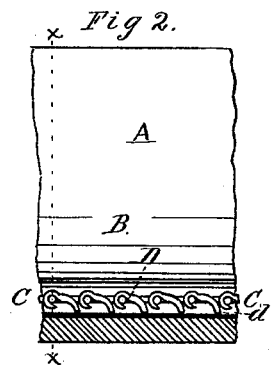
Figure 3:
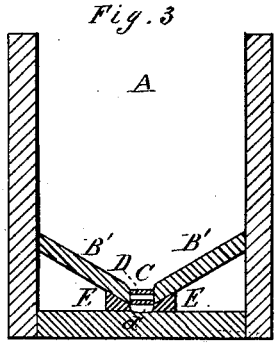
Figure 4:
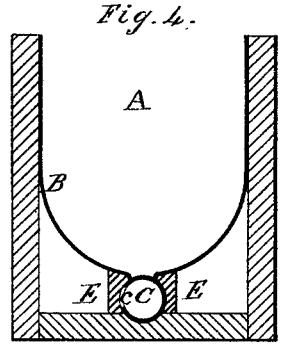
Figure 5:
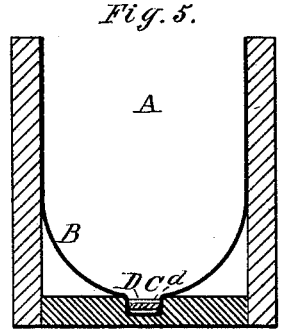

Figure 1 is a transverse section at $x\,x$, Fig. 2. Fig. 2 is a longitudinal section at $x'\,x'$, Fig. 1, showing a short length of the conveyer-box, omitting the screw. Figs. 3, 4, and 5 are transverse sections, showing modifications of the improvement.

My improvement does not apply to the screw-conveyer, but only to a device for clearing grain or other material from the bottom of the trough or box beneath the screw-conveyer.

In the preferred form the improvement consists in forming at the bottom of the trough a channel or cavity, by which any material remaining at the bottom of the trough, especially at the hangers, may be carried out to clear the trough or box for use for another kind or quality of grain or other material. As a modification there might be space left beneath the conveyer to receive a chain or belt to carry out the material which the screw-conveyer failed to carry along. In this case the form of the lining of the trough need not be changed.

Previous to my invention no conveyer on the screw principle had been made that was so perfect as to remove every particle of the material from the trough or box in which it worked. This resulted from the necessary use of hangers at stated intervals to support long lines of conveyers, making a break in the flight-screw; and if between the hangers the material was all taken out of the trough immediately under the hanger it would remain. My improvement is to provide a means of obviating this difficulty by providing means for absolutely removing all material from the trough, so as to prevent the mixing of grain or other material when different kinds or grades are to be passed through. This is of vast importance to the grain interest and to the people at large.

This appliance obviates the necessity of running the conveyer proper so close to the bottom of the trough as to break the grain, as is ordinarily done to avoid, as much as is practicable, the mixing of different kinds of grain or grades of the same, my improvement thus obviating the deterioration of the grain and friction resulting from the above cause.

I have shown in the drawings different modifications, but all the figures show a channel or space in the bottom of the trough, by which all the material left by the screw-conveyer can be removed. This channel may be of any form, the essential feature being that it admits the application of a device or means for the removal of material in addition to or apart from the screw-conveyer.

A is the box or trough, having preferably the metal lining B, as shown in Figs. 1, 2, 4, and 5, although in place of this cant-boards B' may be used, as shown in Fig. 3. At the bottom of the trough is a cavity or space, C, beneath the screw-conveyer S. (See Fig. 1.) As shown in Figs. 1, 2, and 3, this channel contains a chain, D, so constructed as to carry the grain or other material from the channel by running lengthwise therein, while in Fig. 5 a belt is shown as the means for the removal of the material from the channel. The chain or belt may be endless and pass around pulleys at the end of the box A, running back below or above the box. It is not considered necessary to describe this particularly, as ways of running endless belts and chains are well known, and I do not claim any novelty in the same. The chain or belt may be at rest while the screw-conveyer is in operation, or may be run continuously and its motion continued a sufficient time after the supply of material to the trough has been cut off to remove the remaining material.

I do not confine myself to any particular form or construction of chain or belt D. I have shown them as carrying projections or flights $d$ to carry the material along; but the flights are not considered an essential feature of the chain or belt.

In Fig. 4 I show a modification, in which the channel C consists of a pipe open upon one side by a slot, $c$, extending the length of the box A. The said slot may be opened to the trough by turning the pipe so as to bring the slot in conjunction with the longitudinal aperture in the bottom of the trough. When this is done the pipe receives any grain or other material that may have been left by the screw-conveyer. When the pipe is charged the opening c is closed by turning the pipe into the position shown, and then the contents of the pipe may be removed by forced blast or suction. This charging and discharging of the pipe may take place more than once if all the material is not discharged from the trough at one operation.

In Figs. 1 and 2 the channel C is shown as formed between strips E, secured to the bottom of the box A, said channel being metal-lined, as shown, or being unlined. In Fig. 3 the channel is shown by the inner edges of the cant-boards B', the strips E, and the bottom of the box A. In Fig. 4 the channel consists of the pipe C, while in Fig. 5 the channel is sunk into the bottom of the box. The channel or space C may be formed without any change in the trough or box A by raising the conveyer a sufficient distance in the box to admit a conveying chain or belt, D, beneath the screw-conveyer.

The discharging device D may run continuously, or may only be run at times when it is desired to clear the trough.

I claim as my invention—

The combination, with the main conveyer-box A and screw-conveyer S, of the channel C and supplemental conveyer D, as and for the purposes specified.

HENRY W. CALDWELL.

Witnesses:
SAML. KNIGHT,
FRANK C. CALDWELL,
OLIVER N. CALDWELL.